United States Patent
Aldrich, III et al.

(10) Patent No.: US 9,302,674 B2
(45) Date of Patent: Apr. 5, 2016

(54) METHOD TO MAXIMIZE AVAILABLE REGENERATION WHILE MAINTAINING LINEAR VEHICLE DECELERATION RATE

(71) Applicant: GM GLOBAL TECHNOLOGY OPERATIONS LLC, Detroit, MI (US)

(72) Inventors: William L. Aldrich, III, Davisburg, MI (US); Matthew Hawkins, Commerce Township, MI (US); Sean W. McGrogan, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 287 days.

(21) Appl. No.: 14/018,503

(22) Filed: Sep. 5, 2013

(65) Prior Publication Data
US 2015/0066266 A1    Mar. 5, 2015

(51) Int. Cl.
| | |
|---|---|
| *B60W 30/18* | (2012.01) |
| *B60W 20/00* | (2006.01) |
| *B60W 10/06* | (2006.01) |
| *B60W 10/11* | (2012.01) |
| *B60W 10/196* | (2012.01) |
| *H02P 3/14* | (2006.01) |
| *B60L 7/18* | (2006.01) |
| *B60L 11/14* | (2006.01) |

(Continued)

(52) U.S. Cl.
CPC ............ *B60W 30/18127* (2013.01); *B60L 7/18* (2013.01); *B60L 11/14* (2013.01); *B60L 15/2009* (2013.01); *B60L 15/2054* (2013.01); *B60W 10/06* (2013.01); *B60W 10/11* (2013.01); *B60W 10/196* (2013.01); *B60W 20/30* (2013.01); *H02P 3/14* (2013.01); *B60L 2240/423* (2013.01); *B60L 2240/443* (2013.01); *B60L 2240/486* (2013.01); *B60L 2250/26* (2013.01); *H02P 3/04* (2013.01); *Y10S 903/93* (2013.01)

(58) Field of Classification Search
CPC ................ B60L 11/14; B60L 15/2054; B60L 2240/423; B60L 2240/443; B60L 2240/486; B60L 2250/26; B60L 7/18; B60W 10/06; B60W 10/11; B60W 10/196; B60W 20/30; B60W 30/18127; H02P 3/04; H02P 3/14; Y10S 903/93
See application file for complete search history.

(56) References Cited

U.S. PATENT DOCUMENTS

| | | | | |
|---|---|---|---|---|
| 7,311,163 | B2 * | 12/2007 | Oliver | 180/165 |
| 7,647,997 | B2 * | 1/2010 | Oliver | 180/165 |
| 2006/0102394 | A1 * | 5/2006 | Oliver | 180/65.2 |

(Continued)

FOREIGN PATENT DOCUMENTS

DE    102008032769 A1    1/2010

*Primary Examiner* — Thomas G Black
*Assistant Examiner* — Ce Li (57) ABSTRACT

A method for maximizing regenerative energy captured by an electric machine in a powertrain including an engine, the electric machine and a transmission device configured to transfer torque through a driveline includes detecting an operator brake request and monitoring a time between the detected operator brake request and a preceding operator brake request that was last detected. A maximized regenerative deceleration event is initiated if the time exceeds a predetermined threshold time that includes monitoring a current fixed gear ratio that is selected from among a plurality of fixed gear ratios of the transmission device when the operator brake request is detected and applying a magnitude of torque at the axle that is sufficient for achieving a maximum capability of the electric machine to capture regenerative energy in the current fixed gear ratio.

15 Claims, 3 Drawing Sheets

(51) Int. Cl.
  *B60L 15/20* (2006.01)
  *H02P 3/04* (2006.01)

(56) References Cited

U.S. PATENT DOCUMENTS

| | | | |
|---|---|---|---|
| 2007/0107958 A1* | 5/2007 | Oliver | 180/65.4 |
| 2008/0208422 A1* | 8/2008 | Shibata et al. | 701/54 |
| 2009/0149295 A1* | 6/2009 | Yamamoto et al. | 477/109 |
| 2009/0150035 A1* | 6/2009 | Soliman et al. | 701/54 |
| 2011/0177903 A1* | 7/2011 | Campbell | 475/149 |
| 2011/0239801 A1* | 10/2011 | Inagaki et al. | 74/473.1 |
| 2012/0031692 A1* | 2/2012 | Koike | 180/65.25 |
| 2012/0203438 A1* | 8/2012 | Breuer et al. | 701/70 |
| 2012/0265382 A1* | 10/2012 | Nefcy et al. | 701/22 |
| 2012/0290163 A1* | 11/2012 | Inagaki et al. | 701/22 |
| 2013/0020858 A1* | 1/2013 | Maki et al. | 303/3 |

\* cited by examiner

METHOD TO MAXIMIZE AVAILABLE REGENERATION WHILE MAINTAINING LINEAR VEHICLE DECELERATION RATE

TECHNICAL FIELD

This disclosure is related to regenerative torque management in hybrid powertrain systems.

BACKGROUND

The statements in this section merely provide background information related to the present disclosure. Accordingly, such statements are not intended to constitute an admission of prior art.

Known powertrain architectures include torque-generative devices that generate and transfer torque via a torque transmission device to a driveline including one or more drive wheels for traction to propel a vehicle. Torque-generative devices may include an internal combustion engine and/or other machine(s) not utilizing internal combustion as an energy source. The other non-internal combustion energy sources may include stored electric energy, stored hydraulic energy, and stored pneumatic energy to generate tractive torque. Electric machine(s) may utilize stored electric energy to create torque. Additionally, electric machine(s) may transform vehicle kinetic energy that is transmitted through the drive wheels to energy that is storable in an energy storage device.

Known hybrid powertrain architectures may include an engine crankshaft rotatably coupled to an electric machine via a mechanical coupler in a fixed ratio. The engine, electric machine and mechanical coupler can be arranged in a belt-alternator-starter (BAS) configuration. During deceleration events, the electric machine can capture regenerative energy through negative torque applied to the vehicle's axles and an electrical energy storage device can store the regenerative energy. It is known to limit the maximum capability of the electric machine to capture regenerative energy associated with a highest transmission gear state in order to maintain a constant vehicle deceleration rate and avoid unacceptable changes in the vehicle deceleration rate when utilizing the maximum capability of the electric machine to capture regenerative energy associated with lower transmission gear states. As a result, hybrid powertrain architectures arranged in the BAS configuration may not fully utilize the maximum capability of the electric machine when in the lower transmission gear states in order to maintain a constant vehicle deceleration rate.

SUMMARY

A method for maximizing regenerative energy captured by an electric machine in a powertrain including an engine, the electric machine and a transmission device configured to transfer torque through a driveline includes detecting an operator brake request and monitoring a time between the detected operator brake request and a preceding operator brake request that was last detected. A maximized regenerative deceleration event is initiated if the time exceeds a predetermined threshold time that includes monitoring a current fixed gear ratio that is selected from among a plurality of fixed gear ratios of the transmission device when the operator brake request is detected and applying a magnitude of torque at the axle that is sufficient for achieving a maximum capability of the electric machine to capture regenerative energy in the current fixed gear ratio.

BRIEF DESCRIPTION OF THE DRAWINGS

One or more embodiments will now be described, by way of example, with reference to the accompanying drawings, in which.

DETAILED DESCRIPTION

Figure 1:
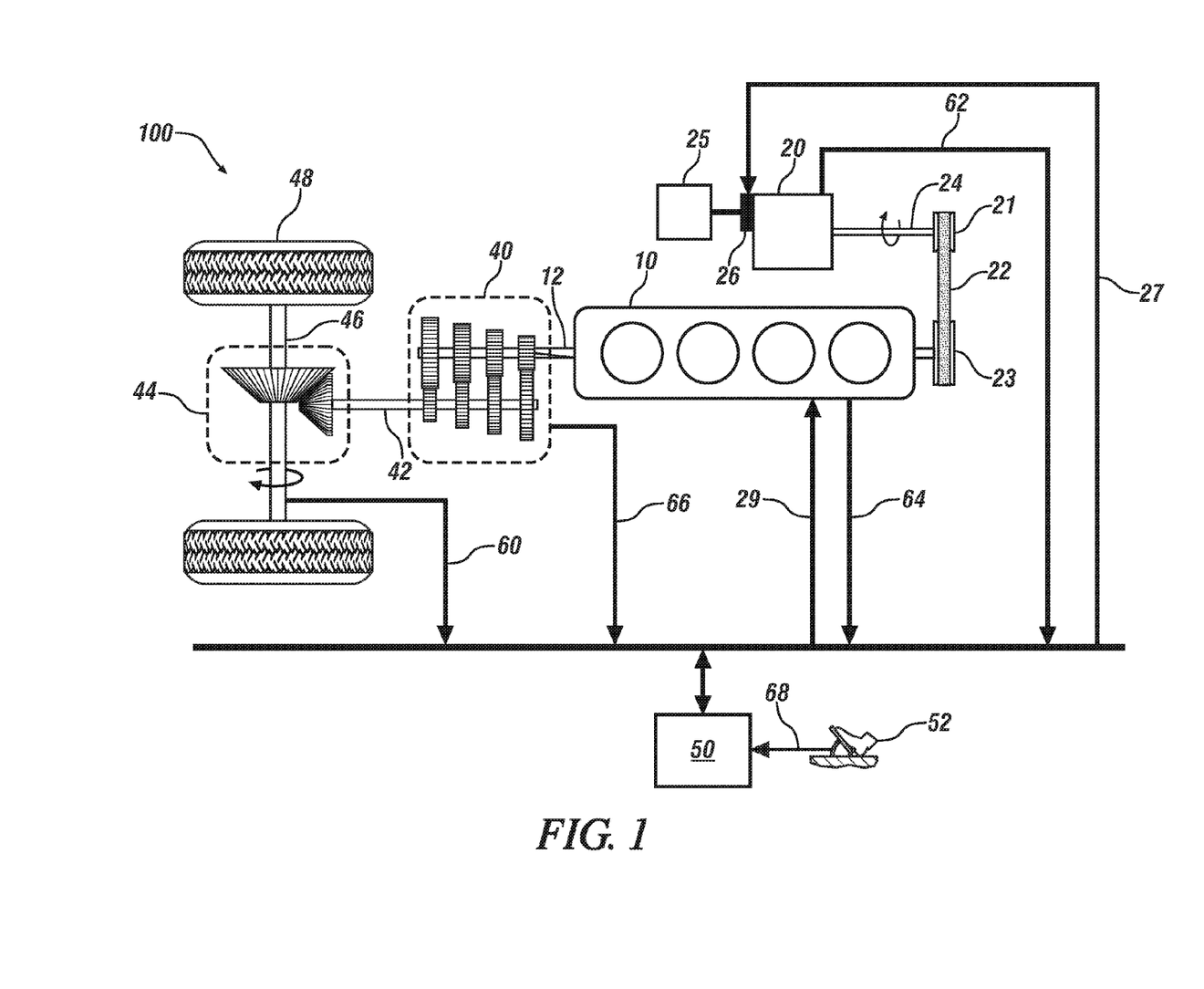
FIG. 1 illustrates a hybrid powertrain system including an internal combustion engine, a torque transfer device, a torque machine, and a transmission device configured to transfer torque to a driveline, in accordance with the present disclosure.

Referring now to the drawings, wherein the showings are for the purpose of illustrating certain exemplary embodiments only and not for the purpose of limiting the same, FIG. 1 schematically illustrates a hybrid powertrain system 100 including an internal combustion engine 10, an electric machine 20, and a transmission device 40 configured to transfer torque through a driveline 42 to an axle 46 including one or more drive wheels 48. A final drive device 44 including a plurality of meshingly engaged gear elements rotatably couples the driveline 42 to the axle 46 providing torque at a fixed final drive ratio between the driveline 42 and the axle 46. The exemplary powertrain system can be configured as front-wheel drive or real-wheel drive. The internal combustion engine 10 and the electric machine 20 are any suitable machines and the transmission device 40 includes a plurality of meshingly engaged gear elements selectively operative between a plurality of fixed gear ratios. In one embodiment the electric machine 20 is a multiphase electric motor/generator device that electrically connects to a high-voltage power source 25 via an electric power inverter 26.

In the illustrated embodiment, the engine 10 includes a crankshaft 12 that extends beyond each end of the engine 10. A first end of the crankshaft 12 rotatably couples to a mechanical coupler 22, which rotatably couples to the electric machine 20. The mechanical coupler 22 includes a first element 21 rotatably coupled to the electric machine 20 and a second element 23 rotatably coupled to the engine 10. The mechanical coupler 22 transfers torque between the engine 10 and the electric machine 20 at a fixed ratio, e.g., a pulley ratio, and may include, belts, pulleys and idlers, or alternatively may include meshingly engaged gear elements. The illustrative hybrid powertrain system 100 is arranged in a belt-alternator-starter (BAS) configuration. The second end of the crankshaft 12 rotatably couples to the transmission 40.

A control module 50 monitors inputs from sensors and other sensing devices and controls actuators to operate the hybrid powertrain system 100 in a manner that is responsive to operator commands. Electric machine torque ($T_{Mot}$) 62 is monitored by control module 50. The magnitude of the $T_{Mot}$ 62 may be calculated from an electric power command 27 to the electric power inverter 26, voltage and electric current usage to the electric machine 20. Alternately, the electric machine torque may be measured. The $T_{Mot}$ 62 may be a regenerative torque applied at the electric machine 20 when the $T_{Mot}$ 62 is negative during deceleration events of the vehicle. The regenerative torque is used by the electric machine 20 to capture regenerative energy for storage in the energy storage device 25. The control module 50 further monitors engine torque ($T_E$) 64. A magnitude of $T_E$ 64 may be calculated based on engine operating parameter commands 29 to the engine 10 and monitored engine operating parameters. For instance, the engine operating parameter commands 29 can include, but are not limited to, a commanded fuel rate, a commanded intake mass airflow and a commanded spark advance. Likewise, the monitored engine operating parameters can include, but are not limited to, a monitored engine speed and a monitored in-cylinder pressure. Various methods can be utilized to calculate $T_E$ 64 and this disclosure is not intended to be limited by any one method. A current fixed gear ratio 66 of the transmission 40 is further monitored by the control module 50. The control module 50 is further configured to monitor axle torque ($T_{axle}$) 60 applied at the axle 46. The $T_{axle}$ 60 may be a regenerative torque applied at the axle 46 when the $T_{axle}$ 60 is negative during deceleration events of the vehicle. The control module 50 can further detect an operator torque request, e.g., an operator brake request 68, in response to an operator input to a brake pedal 52 indicating a brake pedal position. The control module 50 commands an engine state and an electric machine state to achieve the operator torque request. In some embodiments, the control module 50 may further command a gear state of the transmission 40 when the transmission includes an automatic transmission.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

In response to the operator input to the brake pedal 52, the vehicle decelerates at a rate based on the operator brake request 68 indicated by the brake pedal position. Exemplary embodiments are directed towards maintaining a constant deceleration rate for a given brake pedal position. Thus, it is desirable for the $T_{axle}$ 60 to remain substantially constant to provide a linear, predictable deceleration rate independent of the current fixed gear ratio 66 of the transmission 40 and vehicle speed. Additionally, the electric power command 27 will result in a regenerative torque applied by the electric machine 20 during the deceleration event, thus capturing energy in the energy storage device 25.

The $T_{axle}$ 60 of the exemplary hybrid powertrain system 100 of FIG. 1 may be expressed as follows:

$$T_{axle} = ((T_{Mot} \times P_r) + T_E) \times GR \times FD \quad [1]$$

wherein $P_r$ is a pulley ratio indicative of the fixed ratio of the mechanical coupler 22, GR is the currently selected fixed gear ratio of the transmission 40, and FD is the final drive fixed ratio of the final drive device 44.

Thus, EQ. [1] demonstrates that the axle torque, $T_{axle}$ 60, applied at the axle 46 is as a function of the current fixed gear ratio 66 of the transmission 40 and the final drive fixed ratio of the final drive device 44 for a given $T_E$ 64 and $T_{Mot}$ 62 applied at the electric machine 20. In other words, a multiplication ratio applied to a given $T_E$ 64 and $T_{Mot}$ 62 based on the current fixed gear ratio 66 of the transmission 40, can be used to determine the $T_{axle}$ 60. Due to the fixed ratio, e.g., pulley ratio, between the engine 10 and the electric machine 20 provided by the mechanical coupler 22, wherein the $T_E$ 64 is relatively constant, the magnitude of $T_{Mot}$ 62 providing regenerative torque must be proportionally reduced every time the transmission 40 shifts to a higher gear ratio during the deceleration event to ensure that a constant deceleration, i.e., a constant $T_{axle}$ 60, for the given brake pedal position.

Based on each of the fixed gear ratios of the transmission 40, a respective multiplication ratio is applied to the $T_{Mot}$ 62 to determine the $T_{axle}$ 60 at the axle 46. For a given $T_{Mot}$ 62, a pulley ratio $P_r$ 22 of 2.4:1 and a final drive ratio FD 46 of 2.64:1, a resulting $T_{axle}$ 60 for each fixed gear ratio 66 of the transmission 40 can be calculated utilizing EQ. [1] as illustrated in Table 1, below.

TABLE 1

| $T_{Mot}$ (Nm) | Current fixed gear ratio | $T_{axle}$ (Nm) |
|---|---|---|
| −55 | 1$^{st}$ fixed gear ratio 4.58:1 | −1,596 |
| −55 | 2$^{nd}$ fixed gear ratio 2.96:1 | −1,031 |
| −55 | 3$^{rd}$ fixed gear ratio 1.91:1 | −665 |
| −55 | 4$^{th}$ fixed gear ratio 1.44:1 | −502 |
| −55 | 5$^{th}$ fixed gear ratio 1.00:1 | −348 |
| −55 | 6$^{th}$ fixed gear ratio 0.74:1 | −258 |

Table 1 includes a non-limiting example that demonstrates for a given electric machine torque, $T_{Mot}$ 62, the magnitude of axle torque, $T_{axle}$ 60, proportionally increases each time the fixed gear ratio of the transmission is lowered, e.g., downshifts. To reduce fluctuations in the $T_{axle}$ 60 during deceleration events for hybrid powertrain systems employing the BAS configuration, it is generally known to limit the regenerative torque applied at the electric machine 20, e.g., $T_{Mot}$ 62, by a highest gear capability in order to maintain constant $T_{axle}$ 60. However, as shown in greater detail below with reference to FIG. 2, the maximum capability of the electric machine 20 to capture regenerative energy in lower gear states is not utilized when the $T_{Mot}$ 62 is limited by the highest gear capability. The maximum capability of the electric machine 20 to capture regenerative energy may hereinafter be referred to as "maximum regenerative energy capability." The term "highest gear capability" refers to the maximum regenerative energy capability in a lowest fixed gear ratio of the transmission. The maximum regenerative energy capability may be expressed in terms of maximum regenerative torque capability at the electric machine 20, $T_{Mot\_capability}$, or maximum regenerative torque capability at the axle 46, $T_{axle\_capability}$. It will be understood based on the relationship expressed in EQ. [1] and illustrated in Table 1, the $T_{axle\_capability}$ may be determined based on the respective multiplication ratio applied to the $T_{Mot\_capability}$ for the current fixed gear ratio of the transmission 40.

Figure 2:
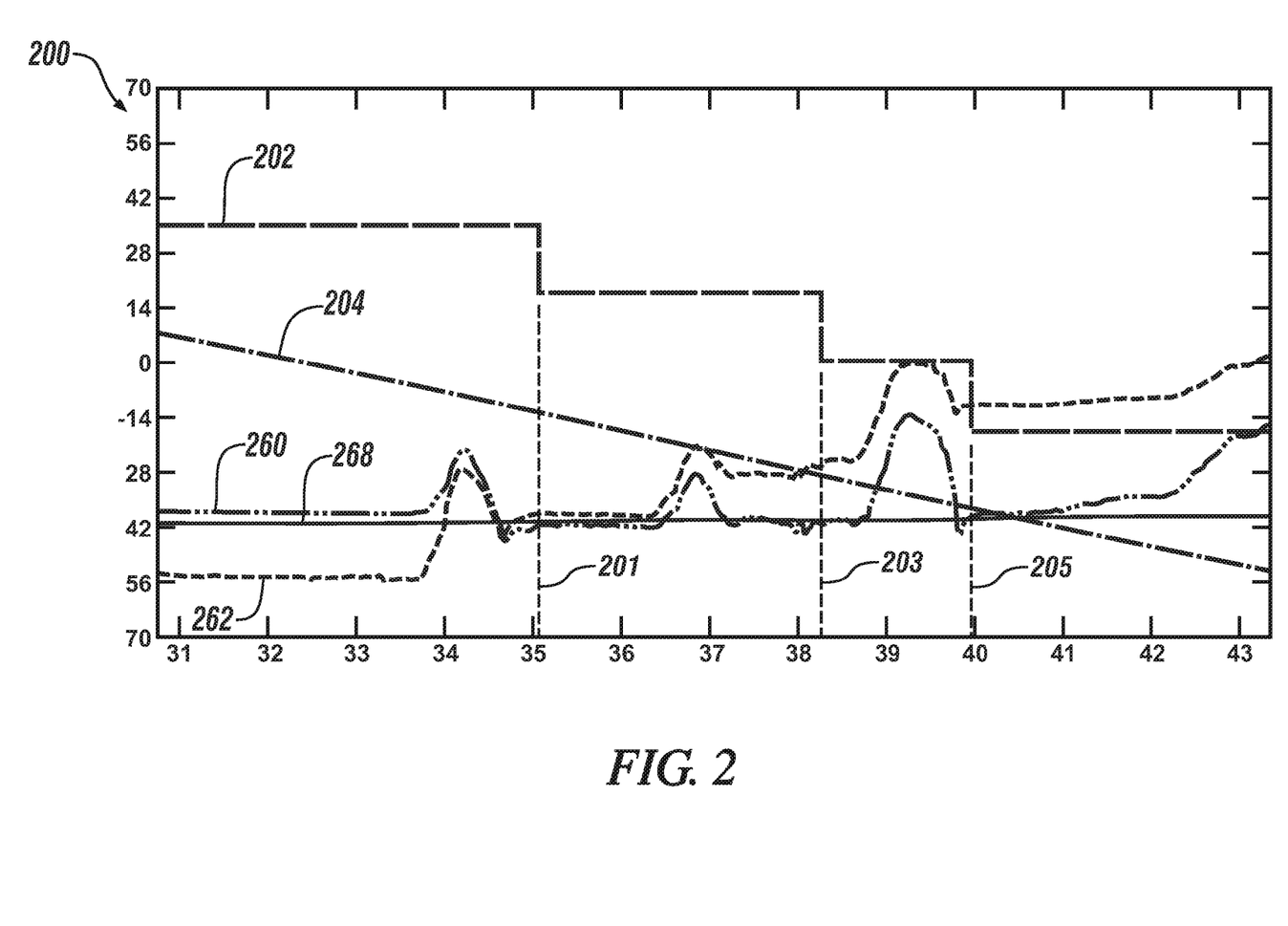
FIG. 2 illustrates a plot of electric machine torque and axle torque profiles through a plurality of transmission downshifts during a deceleration event with respect to a brake pedal position profile, in accordance with the present disclosure.

FIG. 2 illustrates a plot representing electric machine torque and axle torque through a plurality of transmission downshifts during a deceleration event with respect to an operator brake request indicated by a brake pedal position, in accordance with the present disclosure. The horizontal x-axis represents time (seconds) and the vertical y-axis represents torque in Nm. It will be appreciated that the torque units along the vertical y-axis are for the $T_{Mot}$ 62; however, units for the $T_{axle}$ 60 can be determined based on symmetry around a shared 0 Nm point on the vertical y-axis. Profile line 260 represents axle torque, $T_{axle}$ 60, at the vehicle axle 46 of FIG. 1. Profile line 262 represents electric machine torque, $T_{Mot}$ 62, at the electric machine 20 of FIG. 1. Profile line 202 represents a current fixed gear state of the transmission 40 of FIG. 1. Profile line 204 represents vehicle speed. Profile line 268 represents an effectively constant operator brake request indicated by a brake pedal position commanded by a vehicle operator to the brake pedal 52 of FIG. 1. Dashed vertical line 201 represents a time soon after transmission 40 has executed a $5^{th}$ to $4^{th}$ fixed gear ratio downshift during the deceleration event. Dashed vertical line 203 represents a time soon after transmission 40 has executed a $4^{th}$ to $3^{rd}$ fixed gear ratio downshift during the deceleration event. Dashed vertical line 205 represents a time soon after transmission 40 has executed a $3^{rd}$ to $2^{nd}$ fixed gear ratio downshift during the deceleration event.

In the exemplary embodiment, the $T_{axle}$ and the $T_{Mot}$ are both negative. The $T_{axle}$ provides a deceleration rate based on the brake pedal position and the $T_{Mot}$ is indicative of a regenerative torque enabling the electric machine 20 to capture regenerative energy for storage in the energy storage device 25 of FIG. 1. Hereinafter, the $T_{axle}$ and the $T_{Mot}$ will be discussed in terms of magnitude of torque.

The plot 200 of FIG. 2 illustrates a relatively flat axle torque, $T_{axle}$, as indicated by profile line 260, throughout the deceleration event with respect to the given brake pedal position. As aforementioned, it is desirable that the $T_{axle}$ remain fairly constant to provide a linear, predictable deceleration rate for the given brake pedal position. Accordingly, as demonstrated by EQ. [1], the magnitude of $T_{Mot}$ must be proportionally reduced during each successive downshift event to ensure that constant deceleration for the given brake pedal position is maintained due to the electric machine 20 being coupled to the engine 10 at the fixed ratio, e.g., pulley ratio, provided by the mechanical coupler 22 and the current fixed gear ratio provided by the transmission 40. To ensure that constant deceleration is maintained, the magnitude of the $T_{Mot}$ is limited by the maximum regenerative energy capability in a lowest fixed gear ratio. It will be appreciated that the term "lowest fixed gear ratio" can be used interchangeably with the term "highest fixed gear state." In the illustrated embodiment, the lowest fixed gear ratio is the $5^{th}$ fixed gear ratio and the maximum regenerative energy capability, e.g., $T_{A\_Capability}$, in the $5^{th}$ fixed gear ratio is −55 Nm. Thus, in response to a brake pedal position that results in a deceleration event, the $T_A$ providing regenerative torque is limited by the $T_{A\_capability}$ in the $5^{th}$ fixed gear ratio at −55 Nm. As will become apparent, only when the current fixed gear ratio of the transmission is the $5^{th}$ gear ratio, does the $T_{Mot}$, indicative of regenerative torque, achieve the maximum regenerative energy capability at the electric machine 20, $T_{A\_capability}$. Thereafter, the magnitude of the $T_{Mot}$ proportionally decreases from the $T_{A\_capability}$ during each successive downshift of the deceleration event so that the constant $T_{axle}$ can be maintained.

For instance, subsequent to the downshift from the $5^{th}$ fixed gear ratio to the $4^{th}$ fixed gear ratio at dashed vertical line 201, proportionally reducing the $T_A$ to maintain a substantially constant $T_{axle}$, demonstrates that the $T_{Mot}$ is now about −40 Nm. Further, subsequent to the downshift from the $4^{th}$ fixed gear ratio to the $3^{rd}$ fixed gear ratio at dashed vertical line 203, proportionally reducing the $T_{Mot}$ to maintain the substantially constant $T_{axle}$, demonstrates that the $T_{Mot}$ (e.g., regenerative torque) is now only −28 Nm, as indicated by profile line 262. Thus, if a deceleration event is initiated when the current fixed gear ratio is the $3^{rd}$ fixed gear ratio in response to an operator brake request indicating a given pedal position, the magnitude of regenerative torque at −28 Nm is less than half the maximum regenerative energy capability in the lowest fixed gear ratio (e.g., the $5^{th}$ fixed gear ratio) at −55 Nm. Likewise, subsequent to the downshift from the $3^{rd}$ fixed gear ratio to the $2^{nd}$ fixed gear ratio at dashed vertical line 201, proportionally reducing the $T_{Mot}$ to maintain the substantially constant $T_{axle}$, demonstrates that the $T_{Mot}$ (e.g., regenerative torque) is now only −14 Nm, as indicated by profile line 262. Thus, if a deceleration event is initiated when the current fixed gear ratio is the $2^{nd}$ fixed gear ratio in response to an operator brake request, the magnitude of regenerative torque at −14 Nm is only a quarter of the maximum regenerative energy capability in the lowest fixed gear ratio (e.g., the $5^{th}$ fixed gear ratio) at −55 Nm.

Accordingly, plot 200 demonstrates that a greater magnitude of regenerative torque could be captured during deceleration events initiated when the current fixed gear ratio of the transmission 40 includes a higher fixed gear ratio than the lowest fixed gear ratio in order to maximize the magnitude of regenerative torque for capturing regenerative energy while still maintaining the constant $T_{axle}$.

Embodiments disclosed herein are directed toward maximizing regenerative energy captured by the electric machine 20 when certain conditions exist rather than simply limiting the $T_{Mot}$ 62 and the $T_{axle}$ 60 by the maximum regenerative torque capability in the lowest fixed gear ratio (e.g., highest fixed gear state). In an exemplary embodiment, a maximized regenerative deceleration event can be initiated. In the maximized regenerative deceleration event, a current fixed gear ratio that is selected among the plurality of fixed gear ratios of the transmission device 40 is monitored when an operator brake request is detected. The operator brake request can include an operator input to the brake pedal 53 indicating a brake pedal position. A magnitude of $T_{axle}$ 60 is applied that is sufficient for achieving a maximum regenerative energy capacity in the current fixed gear ratio. A corresponding magnitude of $T_{Mot}$ is additionally present. Thereafter, the magnitude of $T_{Mot}$ is reduced for each successive downshift event from the current fixed gear ratio such that the magnitude of torque at the axle is maintained for achieving a linear deceleration rate based on the detected operator brake request, as determined by the brake pedal position. Using the relationship of EQ. [1], the magnitude of $T_{Mot}$ 62 is reduced for each successive downshift event by a proportion that is respective to each fixed gear ratio that the transmission device 40 has downshifted to.

In a non-limiting example, there are situations when the operator rides a brake pedal to decelerate the vehicle and momentarily releases the input to the brake pedal and then re-applies the input to the brake pedal to continue to decelerate the vehicle. As aforementioned, it is desirable to maintain a substantially linear deceleration rate so that the driver experiences an expected drivability. Accordingly, applying the magnitude of $T_{axle}$ 60 that is sufficient for achieving a maximum regenerative energy capacity in a current fixed gear ratio when the input to the brake pedal is re-applied would result in a change from the deceleration rate the driver is expecting, and therefore, is undesirable. In the situation where an elapsed time between the detected operator brake request and a preceding operator brake request that was last detected does not exceed a time threshold, such as in the non-limiting example described above, a limited magnitude of $T_{Mot}$ 62 is applied that corresponds to a maximum regenerative energy capacity in a previous fixed gear ratio. The previous fixed gear ratio is selected when the preceding operator brake request was detected. Thus, in the non-limiting example above, the driver would experience the deceleration rate of when the operator first applied the input to the brake pedal.

Figure 3:
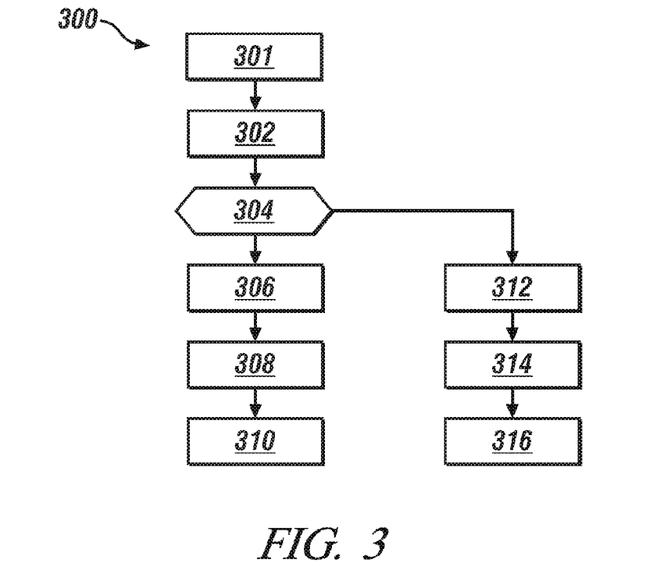
FIG. 3 illustrates an exemplary flowchart for maximizing regenerative energy captured by the electric machine of FIG. 1.

FIG. 3 illustrates an exemplary flowchart 300 for maximizing regenerative energy captured by the electric machine 20 in the vehicle powertrain system 100 of FIG. 1, in accordance with the present disclosure. Table 2 is provided as a key to FIG. 3 wherein the numerically labeled blocks and the corresponding functions are set forth as follows.

TABLE 2

| BLOCK | BLOCK CONTENTS |
|---|---|
| 301 | Start. |
| 302 | Detect operator input to brake pedal. |
| 304 | Does an elapsed time between the detected operator input to the brake pedal and a preceding operator input to the brake pedal that was last detected exceed a time threshold? |
| 306 | Monitor a current fixed gear ratio when the operator brake request is detected. |
| 308 | Apply a magnitude of torque at the electric machine that is sufficient for achieving a maximum regenerative energy capacity in the current fixed gear ratio if the magnitude of torque is less than a magnitude of the operator input to the brake pedal. |
| 310 | Reduce the magnitude of torque at the electric machine for each downshift event. |
| 312 | Monitor a previous fixed gear ratio when the preceding operator input to the brake pedal was detected. |
| 314 | Limit torque at the electric machine that corresponds to a maximum regenerative energy capacity in the previous fixed gear ratio. |
| 316 | Proportionally reduce the magnitude of limited torque at the electric machine for each downshift event. |

The flowchart 300 starts at block 301 and proceeds to block 302 where an operator input to the brake pedal is determined, as indicated by signal 68. An operator brake request can be determined based on the operator input to the brake pedal indicating a brake pedal position. Decision block 304 determines if the time between the detected operator input to the brake pedal and a preceding operator input to the brake pedal that was last detected exceeds a predetermined time threshold. If the time does not exceed the time threshold, the flowchart 300 initiates a limited regenerative deceleration event and proceeds to block 312. If the time exceeds the time threshold, the flowchart 300 initiates a maximized regenerative deceleration event and proceeds to block 306.

At block 306, a current fixed gear ratio of the transmission device 42 is selected when the operator brake request is detected. At block 308, a magnitude of torque at the electric machine ($T_{Mot}$ 62) that is sufficient for achieving a maximum regenerative energy capability in the current fixed gear ratio is applied. It will be appreciated that the magnitude of torque for achieving the maximum regenerative energy capability in the current fixed gear ratio is only applied if the magnitude of torque is less than or equal to a magnitude of torque requested by the operator as indicated by the monitored operator input to the brake pedal. Based on the relationship of EQ. [1], a corresponding magnitude of torque at the axle ($T_{axle}$ 60) is similarly applied. The $T_{axle}$ 60 provides a linear deceleration rate for decelerating the vehicle based on the operator input to the brake pedal, e.g., based on a magnitude of an operator brake request. It is desirable to maintain the linear deceleration rate during each downshift event of the transmission 40 as the vehicle decelerates.

At block 308, the magnitude of torque at the electric machine ($T_{Mot}$ 62) is reduced for each downshift event such that the magnitude of torque applied at the axle ($T_{axle}$ 60) is maintained for achieving the linear deceleration rate. The reduction in $T_{Mot}$ 62 to maintain a constant $T_{axle}$ 60 is based on the relationship of EQ. [1], wherein only the fixed gear ratios of the transmission 40 change during downshift events because the pulley ratio and the final drive ratio are static and that $T_E$ 64 is relatively constant. It will be appreciated that the magnitude of $T_{Mot}$ 62 is reduced for each successive downshift event by a proportion that is respective to each fixed gear ratio that the transmission device has downshifted to. For instance, a downshift from $5^{th}$ to $4^{th}$ fixed gear ratio includes a reduction in $T_{Mot}$ 62 by a respective proportion that may be different than the reduction in $T_{Mot}$ 62 for a downshift from $4^{th}$ to $3^{rd}$ fixed gear ratio. Similarly, downshifts from $3^{rd}$ to $2^{nd}$ gear fixed gear ratio and from the $2^{nd}$ fixed gear ratio to $1^{st}$ fixed gear ratio may all include reductions in $T_{Mot}$ 62 by respective proportions that are different from the other downshifts.

When the limited regenerative deceleration event is initiated, block 312 monitors a previous fixed gear ratio that was selected when the preceding operator input to the brake pedal was detected. At block 314, torque applied at the electric machine ($T_{Mot}$ 62) is limited by a magnitude that corresponds to a maximum regenerative energy capacity in the previous fixed gear ratio monitored in block 312. Based on the relationship of EQ. [1], a corresponding magnitude of torque at the axle ($T_{axle}$ 60) is similarly limited. As aforementioned, $T_{axle}$ 60 provides the linear deceleration rate for decelerating the vehicle based on the operator input to the brake pedal, e.g., based on the magnitude of an operator brake request. It is desired to maintain the linear deceleration rate during each downshift event of the transmission 40 as the vehicle decelerates. At block 316, the magnitude of limited $T_{Mot}$ 62 is proportionally reduced for each downshift event such that the limited magnitude of $T_{axle}$ 60 is maintained for achieving the linear deceleration rate. Block 316 proportionally reduces the magnitude of $T_{Mot}$ 62 in the same manner as discussed above in block 310.

Figure 4:
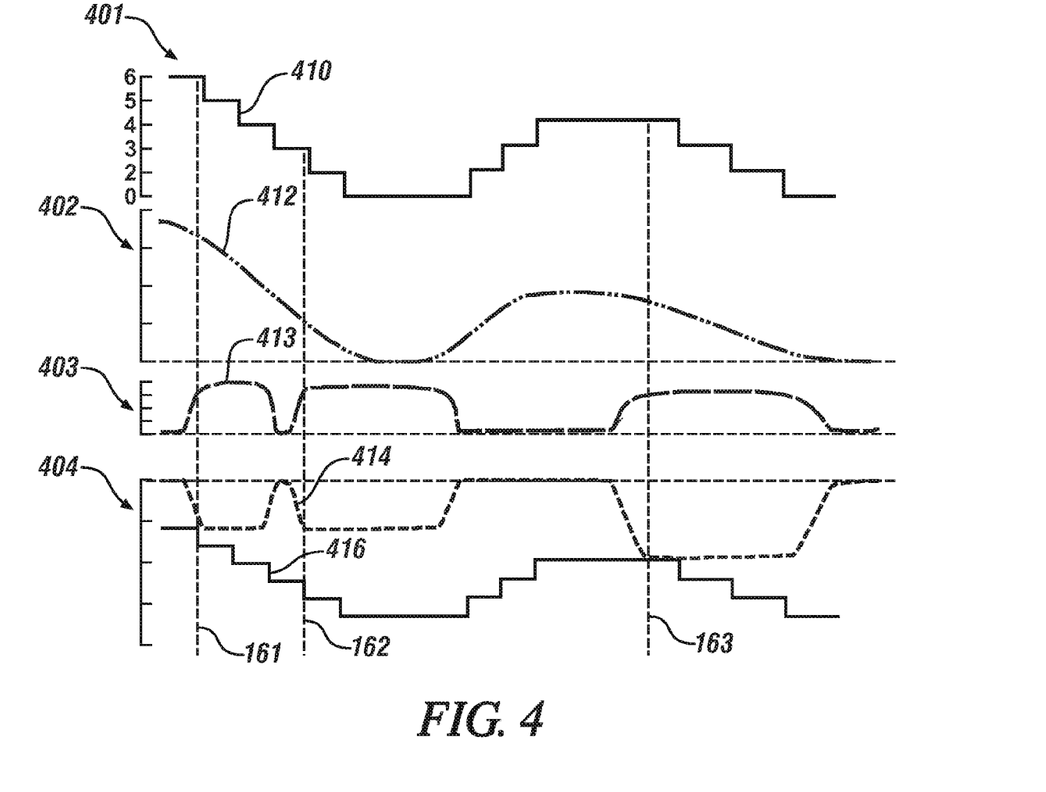
FIG. 4 illustrates a non-limiting example of maximizing regenerative energy captured by the electric machine during operation of the hybrid powertrain system of FIG. 1, in accordance with the present disclosure.

FIG. 4 illustrates a non-limiting example of maximizing regenerative energy captured by the electric machine 20 during operation of the hybrid powertrain system 100 of FIG. 1, in accordance with the present disclosure. A horizontal x-axis in each of the following plots 401, 402, 403 and 404, described in detail below, denotes time (seconds). Plot 401 includes a gear profile 410 indicating a currently selected fixed gear ratio of the transmission 40 at a given time. The vertical y-axis denotes the fixed gear fixed gear state. Plot 402 includes a vehicle speed profile 412. The vertical y-axis denotes vehicle speed (mph). Plot 403 includes a brake pedal position profile 413 indicated by operator brake request signal 68 of FIG. 1, and can similarly be referred to as an operator input to the brake pedal 52 or a magnitude of an operator brake request. The vertical y-axis denotes the magnitude of the operator brake request. Plot 404 includes a requested torque profile 414 and a maximum regenerative energy capability ($T_{axle\_capability}$) profile 416. The vertical y-axis denotes axle torque (Nm) from 0 Nm to −1000 Nm. Dashed vertical lines 161, 162, 163 each include points in time describing events described below.

Referring to plot 404, the requested torque profile 414 includes the torque applied at the axle (e.g., $T_{axle}$ 60) that is requested based on the brake pedal position profile 413. The $T_{axle\_capability}$ profile 416 includes a maximum regenerative torque capability at the axle 46 ($T_{axle\_capability}$) in a selected fixed gear state based on the gear profile 410 of plot 401. It will be understood that each fixed gear state of the gear profile 410 is indicative of a respective fixed gear ratio.

At dashed vertical line 161, an operator input to the brake pedal is detected while the transmission 40 is in a $6^{th}$ fixed gear ratio. Thereafter, the requested torque profile 414 decreases to a torque that is sufficient for achieving the $T_{axle\_capability}$ in the current fixed gear state, i.e., the $6^{th}$ fixed gear ratio. As the vehicle decelerates according to the speed profile 412 of plot 402, the $T_{axle\_capability}$ begins to decrease in accordance with the gear profile 410 of plot 401. In plot 404, the decreasing regenerative torque capability at the axle ($T_{axle\_capability}$) corresponds to an increasing magnitude of $T_{axle\_capability}$. However, the requested torque profile 414 remains constant in accordance with the brake pedal position profile 413 to maintain the deceleration rate that is based on the operator pedal position.

At dashed vertical line 162, the operator input to the brake pedal is re-applied, after briefly being released, as indicated by the brake pedal position profile 413 while in the $3^{rd}$ fixed gear ratio. While the $3^{rd}$ fixed gear ratio is the currently selected fixed gear ratio of the transmission, the $T_{axle}$ 60 as indicated by the requested torque profile 414 is not decreased (e.g., magnitude is not increased) to achieve the $T_{axle\_capability}$ in the $3^{rd}$ fixed gear ratio. Instead, the $T_{axle}$ 60 is limited to a previous fixed gear ratio that was selected when a preceding operator input was last detected, e.g., the $6^{th}$ fixed gear ratio. Because the operator only momentarily released the brake pedal and re-applied the brake pedal at dashed vertical line 162, an elapsed time between the detected operator input to the brake pedal and the preceding operator input to the brake pedal that was last detected does not exceed a time threshold. Accordingly, an abrupt change to the $T_{axle}$ 60 to achieve $T_{axle\_capability}$ in the 3rd fixed gear ratio, e.g., current fixed gear ratio, is avoided; and thus, the deceleration rate expected by the operator is maintained.

Between dashed vertical lines 162 and 163 the operator releases the brake pedal as indicated by brake pedal position profile 413 decreasing to zero. Here, the requested torque profile 414 increases to zero, the vehicle speed profile 412 increases and the maximum regenerative energy capability profile 416 increases by a proportion according to each successive upshift as indicated by the gear profile 410. It will be understood that the fixed gear ratio decreases during each successive upshift.

At dashed vertical line 163, the operator re-applies the brake pedal, as indicated by the brake pedal position profile 413. Here, the elapsed time between the detected operator input to the brake pedal and the preceding operator input to the brake pedal that was last detected exceeds the time threshold. Accordingly, the requested torque profile 414 decreases the $T_{axle}$ 60 (increases a magnitude of the $T_{axle}$ 60) sufficient to achieve the $T_{axle\_capability}$ in the current fixed gear ratio, e.g., the $4^{th}$ fixed gear ratio, as indicated by the $T_{axle\_capability}$ profile 416 and the gear profile 410.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for maximizing regenerative energy captured by an electric machine in a vehicle powertrain system including an internal combustion engine, the electric machine, and a transmission device configured to transfer torque through a driveline to an axle including one or more wheels, the method comprising:
    detecting an operator brake request;
    monitoring a time between the detected operator brake request and a preceding operator brake request that was last detected;
    initiating a maximized regenerative deceleration event if the time exceeds a predetermined threshold time, the maximized deceleration event including:
        monitoring a current fixed gear ratio that is selected from among a plurality of fixed gear ratios of the transmission device when the operator brake request is detected; and
        applying a magnitude of torque at the axle that is sufficient for achieving a maximum capability of the electric machine to capture regenerative energy in the current fixed gear ratio;
    initiating a limited regenerative deceleration event if the time does not exceed the predetermined threshold time, the limited deceleration event including:
        monitoring a previous fixed gear ratio that is selected from among the plurality of fixed gear ratios of the transmission device when the preceding operator brake request was detected;
        limiting torque at the axle to a magnitude that corresponds to a maximum capability of the electric machine to capture regenerative energy in the previous fixed gear ratio; and
        proportionally reducing a magnitude of limited torque at the electric machine for each downshift event such that the limited magnitude of torque applied at the axle is maintained for achieving the linear deceleration rate based on the detected operator brake request.

2. The method of claim 1, further comprising:
    reducing a magnitude of regenerative torque applied at the electric machine for each successive downshift event from the current fixed gear ratio such that the magnitude of torque at the axle is maintained for achieving a linear deceleration rate based on the detected operator brake request.

3. The method of claim 2, wherein the magnitude of regenerative torque applied at the electric machine is reduced for each successive downshift event by a proportion that is respective to each fixed gear ratio that the transmission device has downshifted to.

4. The method of claim 2, wherein the magnitude of torque applied at the axle is a function of a multiplication ratio that is applied to the magnitude of regenerative torque applied at the electric machine.

5. The method of claim 4, wherein the multiplication ratio is based on a selected one of the fixed gear ratios and a pulley ratio provided by a mechanical coupler configured to transfer torque between the engine and the electric machine.

6. Method for maximizing regenerative energy captured by an electric machine in a vehicle powertrain system including an internal combustion engine, the electric machine, and a transmission device configured to transfer torque through a driveline to an axle including one or more wheels, the method comprising:
    detecting an operator input to a brake pedal;
    monitoring a time between the detected operator input to the brake pedal and a preceding operator input to the brake pedal that was last detected;
    initiating a maximized regenerative deceleration event based on the detected operator input to the brake pedal only if the monitored time exceeds a predetermined time threshold, the maximized deceleration event includes:
        monitoring a current fixed gear ratio that is selected from among a plurality of fixed gear ratios of the transmission device when the operator brake request is detected;
        applying a magnitude of torque at the electric machine that is sufficient for achieving a maximum capability of the electric machine to capture regenerative energy in the current fixed gear ratio; and
        reducing the magnitude of torque at the electric machine for each downshift event such that a magnitude of torque applied at the axle is maintained for achieving a linear deceleration rate based on the detected operator input to the brake pedal
    initiating a limited regenerative deceleration event if the time does exceed the predetermined time threshold, the limited deceleration event including;
        monitoring a previous fixed gear ratio that is selected from among the plurality of fixed gear ratios of the transmission device when the preceding operator input to the brake pedal was detected;
        limiting torque applied at the electric machine by a magnitude that corresponds to a maximum capability of the electric machine to capture regenerative energy in the previous fixed gear ratio; and
        proportionally reducing the magnitude of limited torque at the electric machine for each downshift event such that a limited magnitude of torque applied at the axle is maintained for achieving the linear deceleration rate based on the detected operator input to the brake pedal.

7. The method of claim 6, wherein the magnitude of torque applied at the electric machine is reduced for each successive downshift event by a proportion that is respective to each fixed gear ratio that the transmission device has downshifted to.

8. The method of claim 6, wherein the magnitude of torque applied at the axle is a function of a selected one of the fixed gear ratios, a pulley ratio provided by a mechanical coupler configured to transfer torque between the engine and the electric machine, and the magnitude of torque at the electric machine.

9. The method of claim 8, wherein the magnitude of torque applied at the axle is further a function of engine torque.

10. The method of claim 8, wherein the magnitude of torque applied at the axle is further a function of a final drive fixed ratio provided by a final drive device configured to transfer torque between the axle and the driveline.

11. A hybrid powertrain system, comprising:
    an internal combustion engine having a crankshaft that extends beyond each end of the engine;
    an electric machine configured to capture regenerative energy during deceleration events;
    a mechanical coupler including a first element rotatably coupled to the electric machine and a second element rotatably coupled to a first end of the crankshaft, the mechanical coupler configured to transfer torque between the engine and the electric machine at a fixed ratio;
    a transmission device rotatably coupled to a second end of the crankshaft at a first end and rotatably coupled to a driveline at a second end, the transmission device configured to transfer torque through the driveline to an axle including one or more drive wheels;
    a control module executing a routine comprising the steps:
        detecting an operator brake request;
        monitoring a time between the detected operator brake request and a preceding operator brake request that was last detected;
        initiating a maximized regenerative deceleration event if the time exceeds a predetermined threshold time, the maximized deceleration event including:
            monitoring a current fixed gear ratio that is selected among a plurality of fixed gear ratios of the transmission device when the operator brake request is detected,
            applying a magnitude of torque at the axle that is sufficient for achieving a maximum capability of the electric machine to capture regenerative energy in the current fixed gear ratio, and
            reducing a magnitude of regenerative torque applied at the electric machine for each successive downshift event from the current fixed gear ratio such that the magnitude of torque at the axle is maintained for achieving a linear deceleration rate based on the detected operator brake request; and
        initiating a limited regenerative deceleration event if the time does not exceed the predetermined threshold time, the limited deceleration event including:
            monitoring a previous fixed gear ratio that is selected from among the plurality of fixed gear ratios of the transmission device when the preceding operator brake request was detected; and
            limiting torque at the axle to a magnitude that corresponds to a maximum capability of the electric machine to capture regenerative energy in the previous fixed gear ratio.

12. The hybrid powertrain system of claim 11, wherein the magnitude of regenerative torque applied at the electric machine is reduced for each successive downshift event by a proportion that is respective to each fixed gear ratio that the transmission device has downshifted to.

13. The hybrid powertrain system of claim 11, wherein the magnitude of torque applied at the axle is a function of a multiplication ratio applied to the magnitude of regenerative torque applied at the electric machine.

14. The hybrid powertrain system of claim 13, wherein the multiplication ratio is based on a selected one of the fixed gear ratios, a pulley ratio, an engine torque, and a final drive ratio provided by a final drive device configured to transfer torque between the axle and the driveline.

15. The hybrid powertrain system of claim 11, further comprising:
    proportionally reducing a magnitude of limited torque at the electric machine for each downshift event such that the limited magnitude of torque applied at the axle is maintained for achieving the linear deceleration rate based on the detected operator brake request.

* * * * *